(No Model.)

C. HOFFMANN.
GAS PRESSURE GAGE.

No. 318,473.  Patented May 26, 1885.

WITNESSES:
W. J. Lanning
W. C. Gleason

INVENTOR:
Charles Hoffmann
per E. F. Gennert
his Atty.

UNITED STATES PATENT OFFICE.

CHARLES HOFFMANN, OF NEW YORK, N. Y.

GAS-PRESSURE GAGE.

SPECIFICATION forming part of Letters Patent No. 318,473, dated May 26, 1885.

Application filed February 17, 1885. (No model.)

*To all whom it may concern:*

Be it known that I, CHARLES HOFFMANN, a citizen of the United States, residing at New York, in the county and State of New York, have invented a new and Improved Gas-Pressure Gage, of which the following is a specification.

My improvement relates to that class of gas-pressure gages in which two connected columns of water indicate the force or pressure brought to bear upon the surface of one of the columns by the displacement of the liquid; and it consists in so arranging valves, checks, or cocks that the liquid will be hermetically sealed for carrying in the pocket by placing guards around the glass tubes to prevent their accidental breakage, and by introducing indicators for the purpose of noting the pressure.

Figure 1:
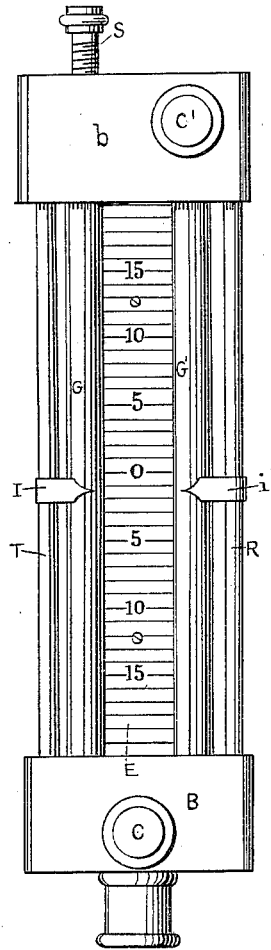
Figure 2:
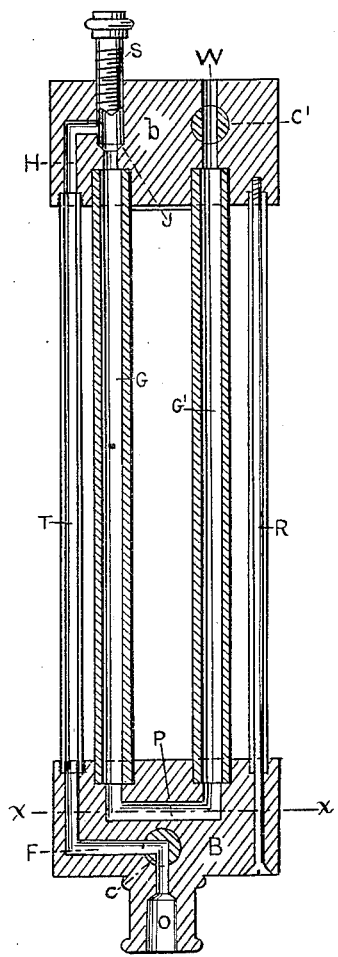
Figure 3:
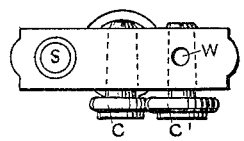
Figure 4:
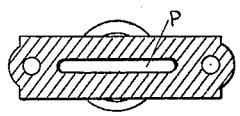

Reference being had to the accompanying drawings, which form part of this specification, Figure 1 represents an elevation of my improved gage; Fig. 2, a section of Fig. 1; Fig. 3, a top view, and Fig. 4 a sectional top view at $x$ $x$.

Similar letters refer to similar parts throughout the several views.

Socket-body B is of metal, provided with an opening, O, to admit of its attachment to a socket or burner. Upper body, $b$, is also of metal. These two bodies have corresponding openings for glass tubes G G', metal tube T, and metal rod R. In cock C the plug or barrel is drilled at right angles, as shown. The plug of cock C' is drilled straight through, as in the ordinary cocks. Screw S has a cone-shaped point which enters into a countersunk seating when the screw is screwed down, and forms a tight joint at J. Rod R is a long screw, which assists tube T in keeping the bodies together. Tube T also serves as a gas-way, and, with rod R, is a guard or protection on either side. On these two guards the adjustable pointers I $i$ are placed. The indicators denote the level or surface of the water in the two glass tubes. E is the ordinary scale, secured between the two glass tubes. Glass tubes G G' are independently set into both bodies B $b$, and connected by a passage, P, at the bottom.

Such being the construction, the operation may be described as follows: The glass tubes having been filled with water through opening W up to the zero-mark, the gage is set upon a socket, and the gas is turned on in the usual manner. Cocks C C' are both turned on, as shown in Fig. 2, and screw S is partly unscrewed. The gas enters passage F, tube T, passage H, and glass tube G, and causes the water in the latter to lower and rise to a corresponding height in tube G'. When a pressure-test is taken in a dim light, where the water-surface cannot be plainly seen, by using a momentary light, like a match, the indicators I may be accurately adjusted, and when the gage is removed and taken into a better light a correct reading of the scale can be had by reason of the indicators. When wishing to pocket the scale, it is only necessary to turn off the two cocks and screw the screw S down upon its seating, when the water will be securely retained within the gage. This latter is also an important feature, because gas-inspectors and others were formerly compelled either to fill the pressure-gages now in use at the place where the test was to be made, or else fill it elsewhere and carefully carry it in a vertical position from a distance to the testing-place.

My improved gage may be carried about in any position, like an ordinary rule almost, the chances of breakage being greatly diminished by the use of the metallic guards T and R.

The drawings represent a four-inch gage, although my device may be made any length, and just as large as any of the common gages now used by the gas companies in their works. Mercury may also be used, instead of water, for ascertaining greater pressures.

Having now fully described my invention, what I claim as new, and desire to secure by Letters Patent of the United States, is—

1. In a gas-pressure gage, the glass tubes G G', the metal tube T, rod R, scale E, and bodies B $b$, in combination with the stop-cocks C C' and the valve-screw S, substantially as set forth and described.

2. In a gas-pressure gage, the glass tubes G G', metal tube T, rod R, scale E, bodies B $b$, stop-cocks C C', and screw S, in combination with the adjustable pointers I $i$, for indicating the pressure, substantially as set forth and described.

CHAS. HOFFMANN.

Witnesses:
E. WHITNEY,
W. J. LANNING.